June 18, 1963 Y. M. PONSAR 3,094,135
ARRANGEMENT FOR FEEDING A REAGENT IN AMOUNTS PROPORTIONAL
TO THE OUTPUT OF WATER TO BE TREATED BY SAID REAGENT
Filed March 9, 1960 2 Sheets-Sheet 1
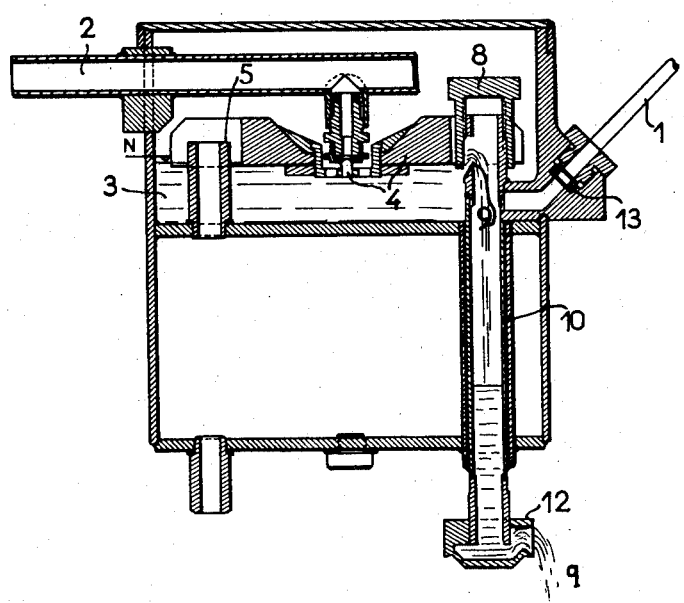
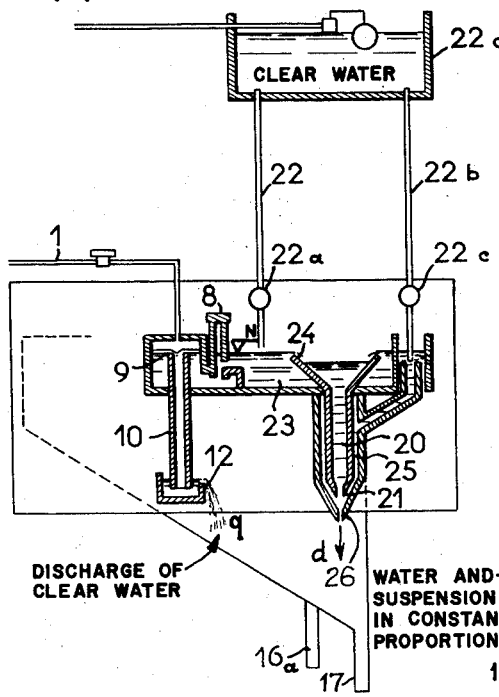
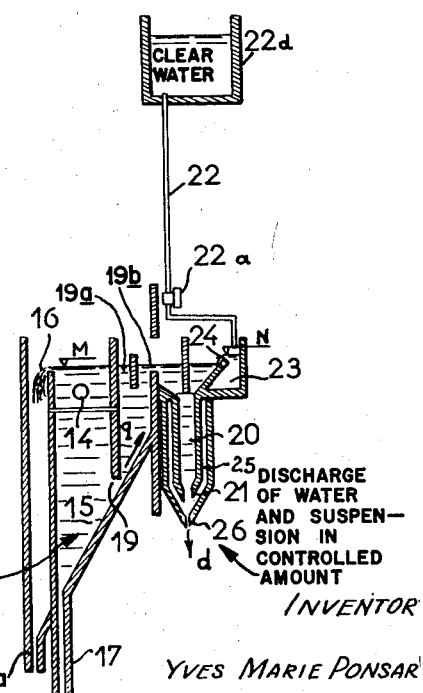
INVENTOR
YVES MARIE PONSAR
By Irvin A. Thompson
ATTY.

United States Patent Office
3,094,135
Patented June 18, 1963

3,094,135
ARRANGEMENT FOR FEEDING A REAGENT IN AMOUNTS PROPORTIONAL TO THE OUTPUT OF WATER TO BE TREATED BY SAID REAGENT
Yves Marie Ponsar, Bois-Colombes, France, assignor to Hydraulique & Urbanisme, Paris, France, a corporation of France
Filed Mar. 9, 1960, Ser. No. 13,873
Claims priority, application France Mar. 10, 1959
2 Claims. (Cl. 137—240)

The present invention has for its object an arrangement for feeding a volume of reagent which is always proportional to the throughput of water to be treated by said reagent, which throughput may vary with time, said reagent being constituted indifferently by a liquid solution or by a liquid laden with a suspended pulverulent reacting substance.

The arrangement according to the invention consists chiefly in a combination of a measuring apparatus and of a pilot apparatus which are interconnected by means of a pipe subjected to the action of gases under a reduced pressure, the measuring apparatus adjusting the throughput of reagent in accordance with the value of said reduced pressure, while the pilot apparatus adjusts the reduction in pressure of the gases in conformity with the throughput of water to be treated.

In a preferred embodiment of the invention, the measuring apparatus includes a vat filled with the reagent up to a constant level and an outfall connecting said vat with a capacity connected in its turn with the pipe passing out of the pilot apparatus and conveying the gases subjected to the above-mentioned reduction in pressure.

According to a modification of the invention, applicable more particularly when the reagent is constituted by a liquid laden with a suspension of a pulverulent substance, the measuring apparatus includes a vat carrying the loaded liquid up to a constant level and a further vat carrying clear diluting water, while a gauged port under head forms a common output for the two vats adapted to feed a predetermined unvarying total output. Such an arrangement allows transforming the adjustment of a throughput of loaded liquid into that of an output of a clear liquid, which is obviously a more convenient procedure. As a matter of fact, and in accordance with a further feature of the invention, the desired output of the loaded liquid is obtained by feeding clear water towards said gauged port in amounts equal to the difference between the natural output of the gauged port and the desired output of loaded liquid. The output of clear water towards the port may be obtained, in particular, by feeding said water in amounts decreasing with the increase of the desired contents of the reagent, or preferably, the output of water may be constant and equal to the natural throughput of the gauged port with the deduction from the amount obtained of a fraction equal to the desired output of loaded liquid. Such a deduction may be performed by a measuring apparatus of the type described hereinabove.

According to a feature of the measuring apparatus, feeding a loaded liquid, the gauged port fed by the vat carrying the loaded liquid and by the vat containing pure water is subjected to the action of a central jet constituted by the loaded liquid and surrounded by an annular vein of clear scavenging water. This removes the risk of the port being fouled, whereby the upkeep of the arrangement is considerably simplified.

In a preferred embodiment of the pilot apparatus, the latter is provided with a pipe dipping into an overflowing stream of the water to be treated, said pipe being connected with a substantially pyramid-shaped capacity, communicating with a further cylindrical capacity, both capacities being interconnected and fed with a predetermined volume of liquid. A tube admitting atmospheric air dips into the liquid carried by the cylindrical capacity. Furthermore, the latter is connected with the pilot pipe conveying the gases under reduced pressure and with a suction apparatus, the delivery end of which opens into the pipe dipping into the overflowing stream.

According to a modification of the pilot apparatus, the latter may include a container through which the output of water to be treated flows in a manner such that the increase of said throughput is proportional to the square root of the lowering of the level inside the container with reference to a reference level, while a capacity opening into the water in said container is connected with means producing a reduction in pressure, with an opening providing an input of air and adapted to be closed under the control of a float and with a pilot pipe transmitting the reduction in pressure.

The invention will be more clearly understood upon reading of the rollowing disclosure of various embodiments of the invention, reference being made to the accompanying drawings, wherein:

FIG. 1 is a vertical sectional view of a measuring apparatus according to the invention.

FIG. 2 is a diagrammatic longitudinal vertical sectional view of a measuring apparatus more particularly applicable to reagents formed by a loaded liquid.

FIG. 3 is a view corresponding to FIG. 2 showing the same apparatus in transverse vertical sectional view.

Figure 5:
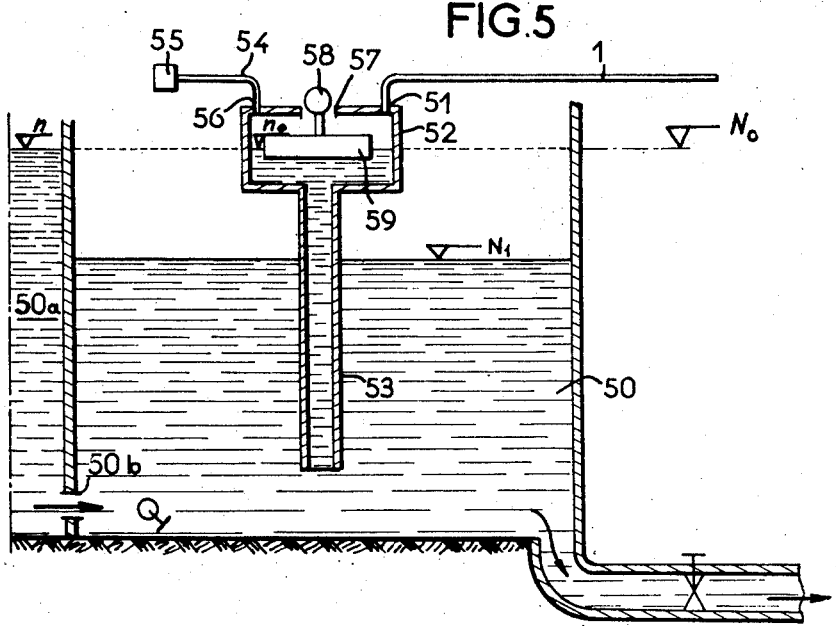
FIG. 5 is a diagrammatic view of a modification of said pilot apparatus.
Figure 4:
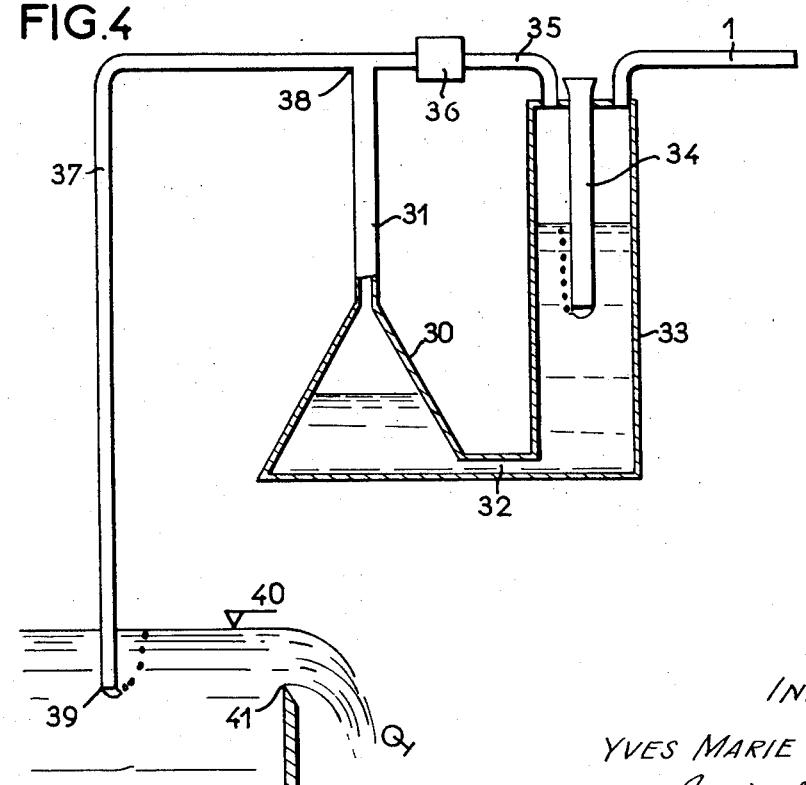
FIG. 4 is a diagrammatic view of a pilot apparatus controlling a measuring apparatus for the reagent.

Referring first to FIG. 1, the latter illustrates a measuring apparatus for adjusting the throughput of a reagent as a function of the reduced pressure or controlled variable vacuum transmitted through the gas conduit or pipe 1; said measuring apparatus can form part of an arrangement including further a pilot apparatus, for instance an apparatus of the type illustrated in FIG. 4 or 5 adapted to adjust said reduction in pressure, in conformity with the output of water to be treated, in a manner such that the output $q$ of the reagent may be proportional to the output $Q$ of the water to be treated.

The measuring apparatus illustrated in FIG. 1 is applicable more particularly, but not exclusively, to a reagent forming a clear or but sparingly loaded solution. It includes a pipe 2 feeding a vat or tank 3 with the reagent. The level N in the vat 3 is held at a constant height through any suitable means, for instance by a floating cock or valve 4. Furthermore, a safety overflow 5 may be provided.

An overflow or weir opening defined by a column outfall wall 9 cut off close to the level N connects the vat 3 with the pipe or column 10 forming a closed capacity. An adjusting plug 8 acting as a cock and as a siphon head is screwed over the upper section of the pipe 10, while the lower section of said pipe 10 dips in the cup 12 forming a fluidtight closure. Out of said cup, the adjusted output $q$ of the reagent flows, so as to be admixed with the output Q of the water to be treated. The pilot pipe 1 is connected at 13 with the pipe 10.

When the pipe 1 is subjected to atmospheric pressure, the level N in the vat 3 registers with the upper edge of the outfall wall 9. The measuring apparatus is no longer operative and no reagent flows out at 12. When the pipe 1 is subjected to a controlled variable vacuum, the measuring apparatus feeds the reagent at 12 and the output $q$ is proportional to the square root of the reduction in pressure at 1 and to a parameter associated with the extent of opening of the plug 8.

A number of such measuring apparatus may be provided for feeding outputs for various reagents, said outputs varying in conformity with a pilot sub-atmospheric pressure.

FIGS. 2 and 3 show an arrangement of the measuring apparatus which is more particularly applicable when the reagent is constituted by a pulverulent substance suspended in a liquid, the output of which is to be measured when laden with the reagent.

In the arrangement of said FIGS. 2 and 3, there is provided a constant flow gauged port or orifice 26 adapted to supply, as required, clear water or water loaded with a reagent; the total output provided naturally through the gauged port 26 is constant, while the clear water is admitted with a variable output.

As shown in FIG. 3, the pipe 14 feeds a reagent formed by water and suspension in constant proportion into the vat or tank 15, the level M of which is held constant by an outfall wall 16, while the deposits of solid material, if any, are removed through the draining pipe 17. The output 16a beyond the outfall wall 16 and the draining pipe 17 are connected to means returning to a stirring vat in which the reagent is prepared. The vat 15 is furthermore connected through a first passageway 19, a tank 19a and a second passageway 19b with the upper end of a vertical pipe 20, the lower end of which forms a wide output port 21.

Clear diluting water is fed from the container 22d through the pipe 22 controlled by a cock 22a and opening into a vat or tank 23, which, in the example illustrated, has a constant level N and overflows at 24 into the vertical pipe 20. Similarly, clear scavenging water may be fed through the pipe 22b provided with a cock 22c into a tube or sleeve 25 surrounding coaxially spacedly the pipe 20 and terminating with the above-mentioned gauged port 26 lying underneath the wide output port 21. The pipe 22 feeding clear diluting water and the pipe 22b feeding clear scavenging water may be fed in common by the container 22d of the constant level type.

The natural throughput of the gauged port 26 has a predetermined value $d$; it is sufficient for the total throughput of pure water at 22 and at 22b to be adjusted so as to form together said output $d$, whereby the port 26 feeds only pure water. It is to be noted in this connection that when the level N in the tank 23 feeding clear water is sufficiently high so as to feed a sufficient clear water flow rate in the overflow pipe 20 in comparison with the constant flow defined by the port 26, the pipe 20 is fulfilled with clear water and no flow of water having suspension therein passes from the tank 15 through the passageway 19, the tank 19a and the passageway 19b towards the pipe 20. Then only clear water is discharged from the pipe 20 through the large outlet 21 and since only clear water is also fed to the sleeve 25, only clear water is discharged through the constant flow port 26. In contradistinction, if the output $d$ is purposely reduced by an amount $q$, for instance, through action on the cock 22a feeding the diluting water, there passes immediately at 19 and 20 an output of reagent equal to $q$ and making up for said reduction.

In the embodiment illustrated in FIGS. 2 and 3, a constant feed of clear water is however provided, which is equal to the output $d$ and passes through the pipes 22 and 22b and this output $d$ is reduced by removing an amount $q$ by means of a measuring apparatus 8—9—10—12 of the type illustrated in FIG. 1 and fed by the vat 23 forming the supply of diluting water. This combination allows obtaining an output $q$ of loaded liquid varying as a function of the reduced pressure at 1 through very simple measuring means adjusting the output of clear water. It will be remarked also that the flow of liquid passing through the wide output port 21 is conveyed axially inside a peripheral annular scavenging vein of water during its passage through the gauged port 26, so as to remove any risk of fouling the wall of the latter. The circuits carrying the loaded liquid are devoid of any diaphragm, cock or the like parts requiring an intricate upkeep.

Referring now to FIG. 4 illustrating a pilot apparatus adapted for use more particularly when the throughput of water to be treated Q is measured over and outfall wall 41, a closed capacity 30 of a pyramidal shape is originally filled completely with liquid. It is connected through its apex with a pipe feeding compressed air 31 from the blower 36 and through its lower end with a pipe 32 connected with another closed cylindrical capacity 33, the total amount of water in the interconnected capacities being unvarying.

A pipe 34 dips into the cylindrical capacity 33 and its lower end lies at the same level as the apex of the capacity 30, while its upper end communicates with the atmosphere. Furthermore, a pipe 35 subjected to a reduced pressure produced by the input of the blower 36 and the pilot pipe 1 controlling the measuring apparatus are connected with the upper end of the capacity 33.

Said pipe 35 subjected to a reduced pressure is connected with the input of the blower 36 forming preferably at the same time a compressor setting the pipe 31 under pressure. The latter is connected through a branch pipe at 38 with the pipe 37 opening at 39 inside the stream of water 40 flowing out over the outfall wall 41. The lower end 39 of the branch pipe 37 lies at the same level as the upper edge of the outfall wall 41.

Any rising of the overflowing stream leads to a rise in pressure, which drives a volume of liquid out of the capacity 30 into the capacity 33 proportionally to the cube of the value of the pressure. However, the air bubbles escaping from the lower end of the pipe 34 subject said lower end to atmospheric pressure. The pilot pipe 1 transmits consequently a reduced pressure to the measuring apparatus, the reduction of pressure being proportional to the cube of the difference in level between the upper free surface of the stream 40 and the upper edge of the outfall wall 41, i.e. to the square of the throughput of water flowing over the wall 41.

Now, the measuring apparatus supplies, as precedingly described, an output varying with the square root of the reduction in pressure in the pilot pipe 1. Consequently, the arrangement of the pyramidal capacity allows ensuring linearity between the output $q$ of the reagent and the output Q of the water to be treated. Experience has shown a slight lack of accuracy in said proportionality between the outputs $q$ and Q, but this may be readily corrected by corresponding slight modifications in the shape of the pyramidal container 30 or the cylindrical capacity 33.

FIG. 5 shows a modification of the pilot apparatus which is associated preferably with a container 50 through which the water to be treated passes with an output Q. The container 50 is fed from one or more containers 50a in which the level $n$ is maintained at a constant height, as shown at $N_0$, through any suitable means. One or more ports 50b immersed in the liquid provide for connection between the container or containers 50a with the container 50. By reason of the properties of the ports 50b, the liquid inside the container 50 has a free surface at the level $N_1$, the difference $N_0$—$N_1$ being a function of the square of the throughput Q passing through the container 50.

The outgoing pilot pipe 1 is connected at 51 with a capacity 52, which latter extends downwardly through the open pipe 53 dipping into the container 50 underneath the level $N_1$. A suction pipe 54 connected with the vacuum pump 55 is also connected at 56 with the upper end of the capacity 52. An air input port 57 is furthermore provided at the upper end of the capacity 52 and is controlled by a closing ball 58 connected with a float 59 carried inside the capacity 52. The float 52 is adjusted in a manner such that it opens the air input port 57 when the lower level $n_0$ in the capacity 52 lies at the height illustrated at $N_0$.

The reduction in pressure inside the capacity 52 and the pipe 1 is proportional to the difference in level between $N_1$ and $N_0$. Consequently, the output of water to be treated is proportional to the output of the reagent and the proportion may be adjusted through any suitable means, for instance through operation of a plug similar to the plug 8 shown in FIG. 1.

Of course, the invention is by no means limited to the embodiments described and illustrated and it covers all the modifications thereof falling within the scope of the accompanying claims. As an example of a possible modification, the outfall wall 9 in FIG. 1 may lie higher than the level N, provided that, in the pilot apparatus according to FIGS. 4 and 5, a shifting of the presssure values is ensured, so as to produce a suitable reduction in pressure at the start before the liquids begin flowing out; furthermore, measuring apparatus such as those illustrated in FIGS. 1 to 3 may be controlled by detecting means for the throughput to be treated, which are different from the outfall wall 40 of FIG. 4 or the port 50b of FIG. 5 and even, they may serve for other purposes for which it is desired to measure a liquid output; conversely, the pilot apparatus illustrated in FIGS. 4 and 5 may serve for controlling measuring apparatus differing from those of FIGS. 1 to 3, as long as a reduction in a gas pressure or the like equivalent means transmits the control provided by said pilot apparatus to measuring or the like controlled apparatus.

What I claim is:

1. An apparatus for distributing a mixture of a liquid and of a suspension therein with a controlled amount of the suspension in the liquid, comprising a first tank, first feeding means for feeding liquid having a constant proportion of suspension therein to said first tank, means for maintaining the liquid surface in the first tank to a first predetermined level, an intermediate tank, a first liquid passageway connecting lower portions of said first tank and of said intermediate tank, a second tank, second feeding means for feeding clear liquid to said second tank, an overflow pipe in said second tank having an upper overflow portion located at a second predetermined level higher than said first predetermined level, a second liquid passageway connecting upper portions of said intermediate tank and of said pipe, said second liquid passageway being at a level lower than said first predetermined level, a sleeve member spacedly surrounding said overflow pipe, third feeding means for feeding clear liquid to said sleeve member, a constant flow outlet orifice formed at a lower end portion of said sleeve member, said overflow pipe having a lower end outlet located above said orifice and having a larger section than said orifice, and control means for varying the liquid surfaces in said second tank thereby adjusting the amount of the suspension in the liquid discharge through said constant flow orifice.

2. An apparatus for distributing a mixture of a liquid and of a suspension therein with a controlled amount of the suspension in the liquid, comprising a first tank, first feeding means for feeding liquid having a constant proportion of suspension therein to said first tank, means for maintaining the liquid surface in the first tank to a first predetermined level, an intermediate tank, a first liquid passageway connecting lower portions of said first tank and of said intermediate tank, a second tank, second feeding means for feeding clear liquid to said second tank, an overflow pipe in said second tank having an upper overflow portion located at a second predetermined level higher than said first predetermined level, a second liquid passageway connecting upper portions of said intermediate tank and of said pipe, said second liquid passageway being at a level lower than said first predetermined level, a constant flow orifice through which said overflow pipe discharges, a fluid-tight discharging column device having a weir opening communicating with said second tank and comprising an upper portion below the liquid level in the second tank and a lower portion inwardly spaced from the upper portion and slightly above the liquid level in the second tank, and a gas conduit having a controlled vacuum therein and connected with the upper portion of said column device whereby the amount of the suspension in the liquid discharged through said constant flow orifice depends upon the clear liquid flow rate discharged from said column device which depends in turn upon the controlled vacuum in said gas conduit.

References Cited in the file of this patent

UNITED STATES PATENTS

| | | |
|---|---|---|
| 1,060,143 | Stevenson | Apr. 29, 1913 |
| 1,743,966 | Goudard | Jan. 14, 1930 |
| 1,820,210 | Barker | Aug. 25, 1931 |
| 1,975,710 | Borden | Oct. 2, 1934 |
| 1,997,970 | Hutchinson | Apr. 16, 1935 |
| 2,042,383 | Bird et al. | May 26, 1936 |
| 2,153,450 | Borden | Apr. 4, 1939 |
| 2,622,065 | Whitlock | Dec. 16, 1952 |
| 2,912,995 | Ulanovsky | Nov. 17, 1959 |